(12) United States Patent
Yang et al.

(10) Patent No.: US 9,974,048 B2
(45) Date of Patent: May 15, 2018

(54) SYSTEMS, METHODS, AND DEVICES FOR DISTRIBUTED SCHEDULING FOR DEVICE-TO-DEVICE INTERFERENCE MITIGATION

(71) Applicant: INTEL IP CORPORATION, Santa Clara, CA (US)

(72) Inventors: Rongzhen Yang, Shanghai (CN); Hujun Yin, Saratoga, CA (US); Huaning Niu, Milpitas, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 191 days.

(21) Appl. No.: 14/771,869

(22) PCT Filed: Mar. 27, 2014

(86) PCT No.: PCT/US2014/032032
§ 371 (c)(1),
(2) Date: Sep. 1, 2015

(87) PCT Pub. No.: WO2014/175990
PCT Pub. Date: Oct. 30, 2014

(65) Prior Publication Data
US 2016/0037547 A1  Feb. 4, 2016

Related U.S. Application Data

(60) Provisional application No. 61/816,662, filed on Apr. 26, 2013.

(51) Int. Cl.
*H04W 4/00* (2018.01)
*H04W 68/02* (2009.01)
(Continued)

(52) U.S. Cl.
CPC ............. *H04W 68/02* (2013.01); *H04J 11/00* (2013.01); *H04J 11/005* (2013.01);
(Continued)

(58) Field of Classification Search
CPC ............. H04W 24/06; H04W 72/1231; H04W 76/023; H04J 11/0023
See application file for complete search history.

(56) References Cited

U.S. PATENT DOCUMENTS

| 2009/0010186 A1 | 1/2009 | Li et al. |
| 2009/0011770 A1 | 1/2009 | Jung et al. |

(Continued)

FOREIGN PATENT DOCUMENTS

WO    2013040225 A1    3/2013

OTHER PUBLICATIONS

PCT/US2014/032032, International Search Report and Written Opinion, dated Jul. 17, 2014, 4 pages.
(Continued)

*Primary Examiner* — Shaq A Taha
*Assistant Examiner* — Farhad Ali
(74) *Attorney, Agent, or Firm* — Stoel Rives LLP

(57) ABSTRACT

Systems, methods, and devices for device-to-device (D2D) distributed scheduling are disclosed herein. User equipment (UE) is configured to measure a received power level for a reference signal received from a target UE and measure received power levels for reference signals received from one or more non-target UEs. The UE is configured to generate a resource usage map for the target UE and the one or more non-target UEs. The UE is configured to determine a priority, with respect to the target UE, for each resource element group based on the resource usage map and an anticipated signal-to-interference ratio (SIR). The UE is configured to transmit data to the target UE during one or (Continued)

more resource element groups with the highest priorities for the target UE.

18 Claims, 8 Drawing Sheets

(51) Int. Cl.
| | |
|---|---|
| H04N 7/14 | (2006.01) |
| H04W 28/02 | (2009.01) |
| H04W 72/04 | (2009.01) |
| H04W 52/02 | (2009.01) |
| H04W 76/04 | (2009.01) |
| H04W 8/00 | (2009.01) |
| H04L 5/00 | (2006.01) |
| H04W 88/02 | (2009.01) |
| H04W 36/00 | (2009.01) |
| H04W 60/00 | (2009.01) |
| H04L 29/06 | (2006.01) |
| H04W 8/22 | (2009.01) |
| H04J 11/00 | (2006.01) |
| H04W 24/06 | (2009.01) |
| H04W 72/12 | (2009.01) |
| H04W 48/18 | (2009.01) |
| H04L 12/14 | (2006.01) |
| H04L 29/08 | (2006.01) |
| H04L 1/18 | (2006.01) |
| H04W 52/32 | (2009.01) |
| H04N 7/15 | (2006.01) |
| H04W 68/00 | (2009.01) |
| H04L 12/26 | (2006.01) |
| H04L 1/16 | (2006.01) |
| H04W 52/08 | (2009.01) |
| H04L 12/801 | (2013.01) |
| H04W 76/06 | (2009.01) |
| H04W 48/06 | (2009.01) |
| H04W 76/02 | (2009.01) |
| H04W 88/06 | (2009.01) |
| H04N 21/4728 | (2011.01) |
| H04N 21/4788 | (2011.01) |
| H04N 21/6437 | (2011.01) |
| H04W 52/14 | (2009.01) |
| H04W 52/24 | (2009.01) |

(52) U.S. Cl.
CPC ........ *H04J 11/0023* (2013.01); *H04L 1/1671* (2013.01); *H04L 1/1812* (2013.01); *H04L 5/005* (2013.01); *H04L 5/0007* (2013.01); *H04L 5/0032* (2013.01); *H04L 5/0033* (2013.01); *H04L 5/0073* (2013.01); *H04L 12/1407* (2013.01); *H04L 29/06068* (2013.01); *H04L 43/16* (2013.01); *H04L 47/12* (2013.01); *H04L 65/1006* (2013.01); *H04L 65/1016* (2013.01); *H04L 65/1069* (2013.01); *H04L 65/1073* (2013.01); *H04L 65/602* (2013.01); *H04L 65/608* (2013.01); *H04L 65/80* (2013.01); *H04L 67/10* (2013.01); *H04N 7/141* (2013.01); *H04N 7/147* (2013.01); *H04N 7/15* (2013.01); *H04W 4/005* (2013.01); *H04W 8/005* (2013.01); *H04W 8/22* (2013.01); *H04W 24/06* (2013.01); *H04W 28/0236* (2013.01); *H04W 28/0289* (2013.01); *H04W 36/0066* (2013.01); *H04W 48/18* (2013.01); *H04W 52/0212* (2013.01); *H04W 52/0216* (2013.01); *H04W 52/08* (2013.01); *H04W 52/32* (2013.01); *H04W 60/00* (2013.01); *H04W 68/00* (2013.01); *H04W 72/0446* (2013.01); *H04W 72/0486* (2013.01); *H04W 72/1231* (2013.01); *H04W 72/1278* (2013.01); *H04W 76/023* (2013.01); *H04W 76/046* (2013.01); *H04W 76/048* (2013.01); *H04W 88/02* (2013.01); *H04L 1/1861* (2013.01); *H04L 5/0044* (2013.01); *H04L 5/0055* (2013.01); *H04L 47/10* (2013.01); *H04N 21/4728* (2013.01); *H04N 21/4788* (2013.01); *H04N 21/6437* (2013.01); *H04W 48/06* (2013.01); *H04W 52/146* (2013.01); *H04W 52/242* (2013.01); *H04W 52/325* (2013.01); *H04W 76/027* (2013.01); *H04W 76/068* (2013.01); *H04W 88/06* (2013.01); *Y02B 60/50* (2013.01)

(56) References Cited

U.S. PATENT DOCUMENTS

| | | | |
|---|---|---|---|
| 2011/0021153 | A1 | 1/2011 | Safavi |
| 2012/0020234 | A1 | 1/2012 | Laroia et al. |
| 2012/0021689 | A1 | 1/2012 | Han |
| 2012/0119902 | A1 | 5/2012 | Patro et al. |
| 2013/0065621 | A1* | 3/2013 | Chang .................. H04W 84/18 455/500 |
| 2013/0083684 | A1* | 4/2013 | Yeh ......................... H04W 8/26 370/252 |

OTHER PUBLICATIONS

Alcatel-Lucent, "LTW D2D Reference System Design and Evaluation Methodology", R1-130953, 3GPP TSG-RAN1 Meeting #72bis, Chicago, USA, Agenda Item 7.3.7, Apr. 15-19, 2013, 8 pages.

* cited by examiner

SYSTEMS, METHODS, AND DEVICES FOR DISTRIBUTED SCHEDULING FOR DEVICE-TO-DEVICE INTERFERENCE MITIGATION

RELATED APPLICATION

This application claims the benefit under 35 U.S.C. § 119(e) of U.S. Provisional Application No. 61/816,662, filed Apr. 26, 2013, which is incorporated by reference herein in its entirety.

TECHNICAL FIELD

The present disclosure relates to device-to-device scheduling and more particularly relates to a distributed scheduler to mitigate interference for device-to-device communication.

DETAILED DESCRIPTION OF PREFERRED EMBODIMENTS

Figure 1:
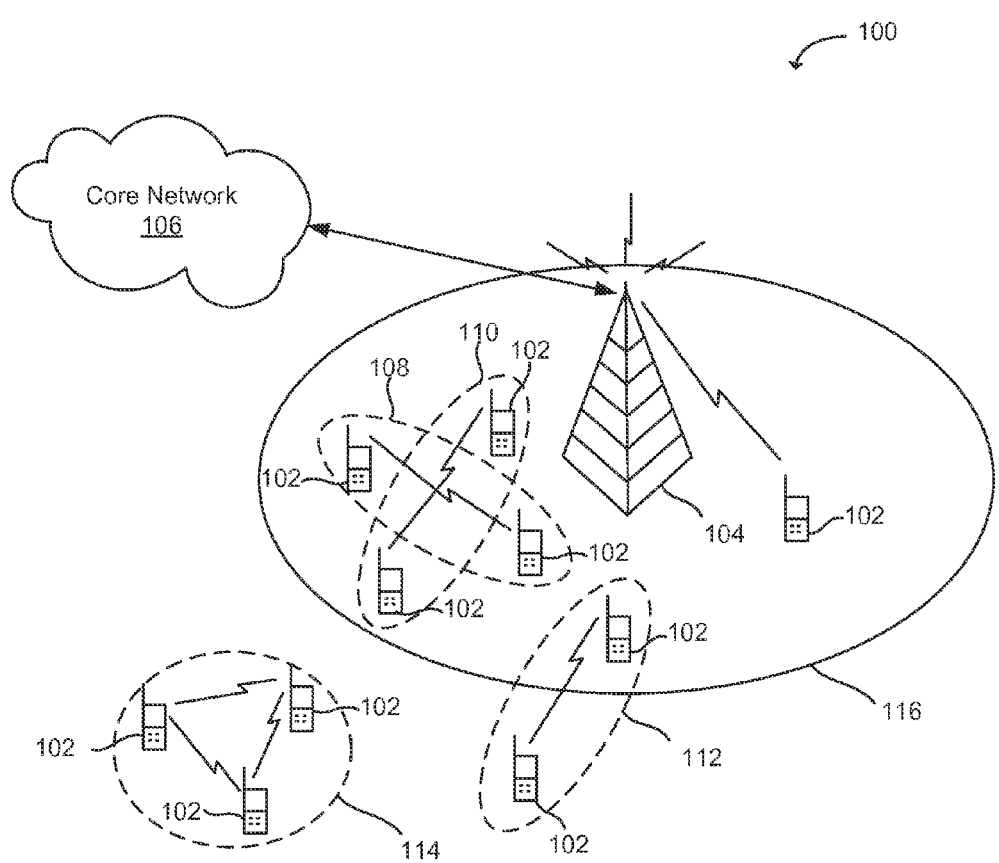
FIG. 1 is a schematic diagram illustrating a communication system and environment consistent with embodiments disclosed herein.

Wireless mobile communication technology uses various standards and protocols to transmit data between a base station and a wireless communication device. Wireless communication system standards and protocols can include, for example, the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In 3GPP radio access networks (RANs) in LTE systems, the base station can include Evolved Universal Terrestrial Radio Access Network (E-UTRAN) Node Bs (also commonly denoted as evolved Node Bs, enhanced Node Bs, eNodeBs, or eNBs), and/or Radio Network Controllers (RNCs) in an E-UTRAN, which communicate with a wireless communication device, known as user equipment (UE).

LTE networks include radio access technology and core radio network architecture that provide high data rate, low latency, packet optimization, and improved system capacity and coverage. In LTE networks, an E-UTRAN includes a plurality of eNodeBs and communicates with a plurality of UEs. A downlink (DL) transmission in a LTE network can be defined as a communication from the eNodeB to a UE, and an uplink (UL) transmission can be defined as a communication from the UE to the eNodeB.

There are various applications and use cases proposed in 3GPP which may involve network initiated or UE initiated communication to or among a group of users and/or devices. In current LTE standard development, device-to-device (D2D) communication is one field for enhancement for future releases (e.g., Release 12 and later versions) where UE are able to communicate directly with other UE without routing communications via an eNodeB or the core network. D2D has been proposed for local social networks, content sharing, location based marketing, serving advertisements, mobile to mobile applications, public safety, etc. D2D communications are of interest due to their ability to reduce load on a core network or access network, increase data rates due to direct and short communication paths, provide public safety communication paths, and provide other functionality.

In order to allow for efficient D2D communications, communications between devices must be scheduled using either a centralized scheduler or a distributed scheduler. A centralized scheduler may include a network component (such as an eNodeB) or other device (such as a peer UE) that controls scheduling. However, centralized scheduling can place a significant load on the network or other scheduling device and may not be available when UEs or other wireless communication devices are not with in a network coverage area. Similarly, some wireless communication systems, such as Wi-Fi networks, do not have a centralized point for scheduling.

A distributed scheduler allows peer devices, such as LTE, Wi-Fi, or WBAN wireless communication devices, to schedule communications with each other. However, distributed schedulers may struggle to provide good system performance in high density situations. For example, in the case of LTE D2D, the random distribution of UEs having random pairings is likely to significantly degrade the overall system performance if a distributed scheduler is not well designed. Similar cases also exist in the current density of WiFi or Wireless Body Area Network (WBAN) deployments.

Applicants have recognized the above distributed scheduling challenges and have identified that a signal-to-interference ratio (SIR) accurately reflects a signal quality and may be used to control interference for D2D radios. Applicants herein disclose distributed schedulers that can reduce the interference among D2D wireless communications even in high density situations based on anticipated SIRs. The present systems, methods, and devices, while discussed predominantly in relation to LTE and cellular communication devices, are also applicable to Wi-Fi, WBAN, or other wireless communication technologies and systems.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure. References in this specification to "an embodiment," "one embodiment," or the like mean that the particular feature, structure, or characteristic being described is included in at least one embodiment of the present disclosure. Occurrences of such phrases in this specification do not necessarily all refer to the same embodiment.

According to one embodiment, a UE is configured with a processor and memory storing instructions to cause the UE to perform a number of operations. The UE is configured to measure a received power level for a reference signal received from a target UE and measure received power levels for reference signals received from one or more non-target UEs. The UE is configured to generate a resource usage map for the target UE and the one or more non-target UEs. The resource usage map indicates resource element groups in an available D2D spectrum for which a corresponding UE is available for reception. The UE is configured to determine a priority, with respect to the target UE, for each resource element group based on the resource usage map and an anticipated SIR. The anticipated SIR is based on the received power level for the reference signal received from the target UE and the reference signals received from one or more non-target UEs. The UE is configured to transmit data to the target UE during one or more resource element groups with the highest priorities for the target UE.

According to another embodiment, a method includes generating a resource usage map for a D2D paired radio and one or more unpaired radios using respective identification information and a predefined random number generator. The resource usage map indicates resource units for which a corresponding radio is available for reception. The method includes determining an anticipated SIR for the paired radio during resource units for which the paired radio is available. The method also includes scheduling a transmission to the paired radio during one or more resource units comprising highest anticipated SIRs.

According to another embodiment, a wireless communication device includes a D2D session component, a resource usage component, and a scheduling component. The D2D session component is configured to establish a D2D session with a paired wireless communication device. The resource usage component is configured to determine available and unavailable resource units for the wireless communication device, the paired wireless communication device, and one or more non-target wireless communication devices using a predefined random number generator. The resource usage component determines the available or unavailable resource units using identifiers for respective wireless communication devices as input to the predefined random number generator, and the random number generator generates identical output based on identical input. The scheduling component is configured to prohibit scheduling of wireless transmission during unavailable resource units for the wireless communication device and prohibit scheduling wireless transmission to the paired wireless communication device during unavailable resource units for the paired wireless communication device.

FIG. 1 is a schematic diagram illustrating some UEs 102 engaged in D2D communication. The UEs 102 are located inside and outside of a coverage area 116 of an eNodeB 104. In one embodiment, the UEs 102 are configured to receive data services from the eNodeB 104 and/or the core network 106. For example, the eNodeB 104 may provide voice, data, Internet, or other communication services to the UE 102 via the eNodeB 104 and/or via the core network 106. The core network 106 may include one or more serving gateways (S-GW), packet data gateways (P-GW), mobility management entities (MME), or other components of an evolved packet core (EPC) or other cellular communication network.

Some of the UEs 102 are shown engaged in D2D communication within D2D groups 108, 110, 112, and 114. At least one UE 102 is shown independent of a D2D group. In D2D communication, a UE 102 or other wireless communication device communicates data directly to another UE 102 rather than routing the data via the eNodeB 104 and/or the core network 106. Various communication technologies may be used for D2D communication including Wi-Fi, Bluetooth, or even licensed cellular technologies (such as within a licensed UL spectrum for an LTE network or provider). Because some of the UEs 102 are communicating directly with other UEs 102, some of the load on the eNodeB 104 and core network 106 may be reduced.

In one embodiment, scheduling for communication between the UEs 102 is performed by a distributed scheduler. The term distributed scheduler is given to mean that at least part of the scheduling is performed by and/or between the UEs 102 themselves, rather than by or via the eNodeB 104. As discussed, in D2D situations, high densities of UEs 102 can be problematic and lead to significantly reduced data rates. For example, the D2D groups 108 and 110 are shown in close proximity and may cause interference with each other. Interference may result in data loss and multiple transmission/reception attempts for the same data which can result in reduced data rates and reduced communication performance.

In one embodiment, each of the UEs 102 is configured to perform distributed scheduling tasks by generating resource usage maps for paired UEs 102 and UEs 102 that are located nearby and/or UEs 102 that may cause interference with paired UEs 102. In one embodiment, using the resource usage maps, the UEs 102 are able to determine anticipated SIRs for different time and/or frequency units. The anticipated SIR can provide a fairly accurate prediction regarding an amount of interference a UE 102 may experience. Transmissions may then be scheduled during time periods that will have lowest anticipated SIRs. Further discussion and description are provided below.

Figure 2:
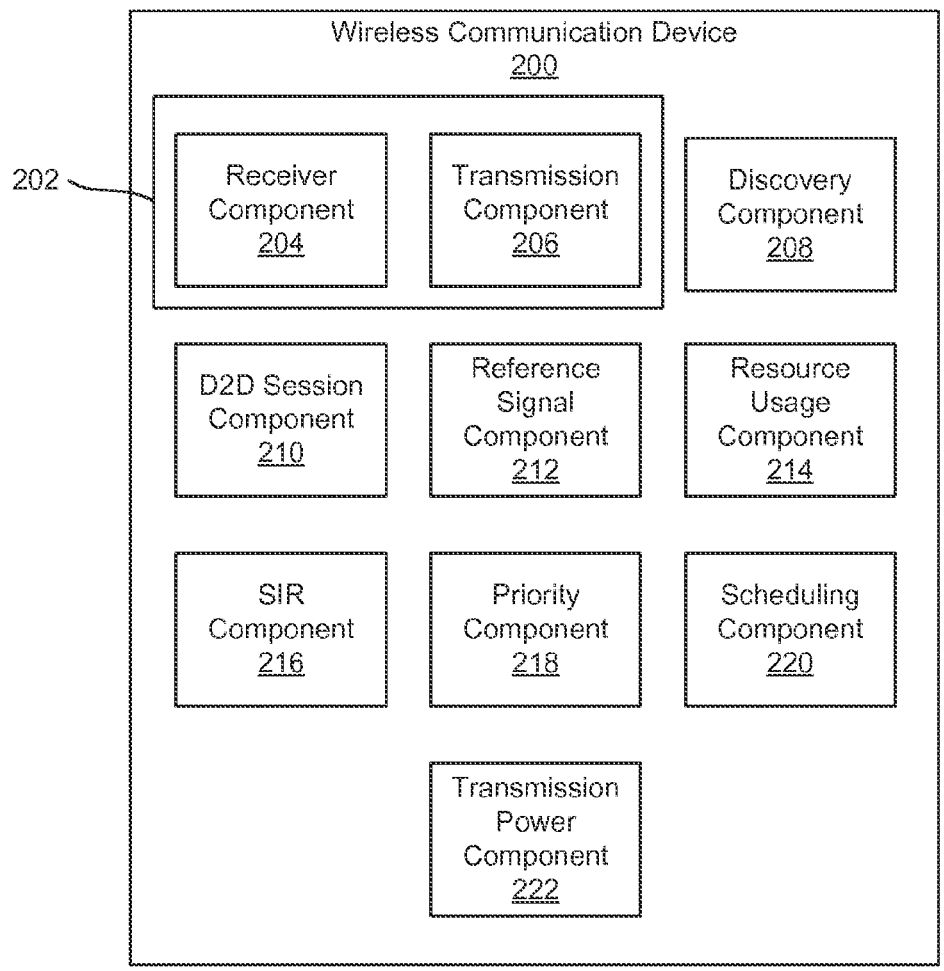
FIG. 2 is a schematic block diagram illustrating components of a wireless communication device consistent with embodiments disclosed herein.

FIG. 2 is a schematic block diagram illustrating one embodiment of a wireless communication device 200 that is configured to perform distributed scheduling. The wireless communication device 200 may include any type of wireless communication device such as a Wi-Fi router or radio, Bluetooth radio, UE 102, or other wireless radio or communication device. For example, the wireless communication device 200 may correspond to at least one of the UEs 102 of FIG. 1. The wireless communication device 200 may be configured to implement standards or functionality corresponding to Wi-Fi, WBAN, or LTE networks or communication.

The wireless communication device 200 includes a transceiver component 202 that includes a receiver component 204 and a transmission component 206. The wireless communication device 200 also includes a discovery component 208, a D2D session component 210, a reference signal component 212, a resource usage component 214, a SIR component 216, a priority component 218, a scheduling component 220, and a transmission power component 222.

The components 202-222 are provided by way of example only and may not all be included in all embodiments. Any combination of one or more of the components 202-222 may be included in a UE 102, radio, or other wireless communication device without limitation.

The transceiver component 202 is configured to transmit and receive data and signals wirelessly. The transceiver component 202 may be configured to operate as a wireless radio in a variety of spectrums and standards including LTE, Wi-Fi, or other wireless communication standard. For example, the receiver component 204 may be configured to receive signals in a UL and/or DL licensed spectrum while the transmission component may be configured to transmit signals in a UL and/or DL licensed spectrum for a cellular provider.

The discovery component 208 is configured to discover nearby radios. For example, the discovery component 208 may be configured to detect nearby UE 102, wireless communication devices, or other radios with which to engage in D2D communication. In one embodiment, the discovery component 208 may discover nearby radios in response to instructions received from an eNodeB 104. In one embodiment, the discovery component 208 may discover identifiers of the nearby radios that will be part of a D2D group (e.g., paired or target radios) as well as UE 102 that are close enough to provide potential interference (unpaired radios). For example, the discovery component 208 may be configured to gather identifiers corresponding to radios with signals within a defined spectrum having at least a minimum power level. The minimum power level may indicate a power level at which potential interference may occur or at which D2D pairing may occur. Referring back to FIG. 1, for example, a UE 102 of group 108 may discover the other UE 102 within group 108 while also discovering UEs 102 within group 110, 112, and/or 114. In one embodiment, a UE 102 may also discover nearby UE 102 that are not engaged in D2D communication but may still be using a licensed spectrum which will be used in D2D communication. For example, in the case that the UEs 102 use licensed UL spectrum for D2D communication, a UE 102 may discover a UE 102 that is sending data to the eNodeB 104 within the UL spectrum.

The D2D session component 210 is configured to establish a D2D session with one or more wireless communication devices. After a D2D session is established, the wireless communication devices may be referred to as paired. For example, the UEs 102 within group 108 in FIG. 1 may be referred to as paired UEs 102. In one embodiment, the D2D session component 210 may establish a D2D session with a UE 102 as instructed by an eNodeB 104, an application running on the UE 102, or in any other manner. For example, the D2D session component 210 may establish a session to form a D2D group, such as groups 108, 110, 112, 114, in which the UE 102 can participate. Similar groups and pairing can be established using Wi-Fi, Bluetooth, and WBAN communication standards or technologies.

The reference signal component 212 is configured to receive reference signals received by the transceiver component 202 at the wireless communication device 200. In one embodiment, the reference signal component 212 measures a received reference signal. For example, the reference signal may measure a received power level for a reference signal received from a paired or unpaired wireless communication device. For example, a UE 102 of group 108 may receive reference signals from another UE 102 within group 108 as well as from unpaired UEs 102 and UEs 102 that are not in any D2D group. In one embodiment, at least one of the reference signals corresponds to a target wireless communication device. The target wireless communication device may include a device with which a parent wireless communication device 200 is paired or a device for which the parent wireless communication device 200 is preparing to send a wireless signal. In one embodiment, the reference signal component 208 determines a channel gain for a particular nearby device. For example, the reference signal component 208 may determine a channel gain for a paired and/or unpaired device. Equation 1 below illustrates one example of how to calculate channel gain.

$$gd = \frac{P_{S,Rx}^{Linear}}{P_{S,Tx}^{Linear}} \qquad \text{Eq. 1}$$

The value gd represents channel gain, $P_{S,Rx}^{Linear}$ represents the received power for the reference signal, and $P_{S,Tx}^{Linear}$ represents the transmitted power for the reference signal. In one embodiment, the reference signal component 212 calculates the gain (gd) for each wireless communication device discovered by the discovery component 208. In one embodiment, the reference signal component 212 can measure the received power ($P_{S,Rx}^{Linear}$) and can receive the transmission power ($P_{S,Tx}^{Linear}$) and then perform the calculation indicated by Equation 1 to determine the channel gain (gd). In one embodiment, the transmission power may be encoded into a reference signal. In other cases, the transmission power or channel gain may be separately communicated to the wireless communication device 200, such as by an eNodeB 104, or the transmission power may be assumed to be a default value. The channel gain and/or received power level may provide information that can be used to calculate a SIR or otherwise anticipate future interference, which will be discussed further below.

In one embodiment, the reference signal component 212 retrieves identification information within a received reference signal. For example, reference signals may include identifiers which uniquely identify a nearby radio with regard to other nearby radios. In another embodiment, the discovery component 208 may discover identification information during the discovery process. The reference signal component 212 may retrieve and/or store the identification information with corresponding received power level, channel gain, or other information. In one embodiment, the identification information may include an identifier used in a corresponding communication protocol. For example, if the reference signal corresponds to a Wi-Fi radio, the identification information may include a media access control (MAC) address for the transmitting radio (such as a router, or other device that communicates over Wi-Fi). If the reference signal corresponds to a UE 102 or other 3GPP device, the identification information may include a UE identifier such as an identifier corresponding to the current D2D session or other identifier that will uniquely identify a UE 102 from multiple other proximate UEs 102. The identifier may include identifiers for devices to communicate in an E-UTRAN, Wi-Fi network, WBAN, or other wireless communication network.

In one embodiment, the reference signal component 212 may update a received power level and/or channel gain based on a most recently received reference signal for a specific wireless communication device.

The resource usage component 214 generates a resource usage map for one or more nearby radios. In one embodiment, the resource usage component 214 generates the resource usage map by determining available and unavailable resource units for the parent wireless communication device 200, a target wireless communication device, a non-target wireless communication device, and/or any other wireless communication device. A resource unit may include any subset of a wireless communication resource divided up by time and/or frequency. For example, frequency resources in LTE are divided up into resource blocks comprising individual resource elements that each correspond to one of a plurality of frequency bands and time periods during which a signal can be transmitted or received. A resource unit may include a group of one or more resource elements, resource blocks, or any other group or logical division of available wireless resource. In some systems, only a single frequency band may be available and the single frequency band may be divided based on discrete time periods.

Figure 3:
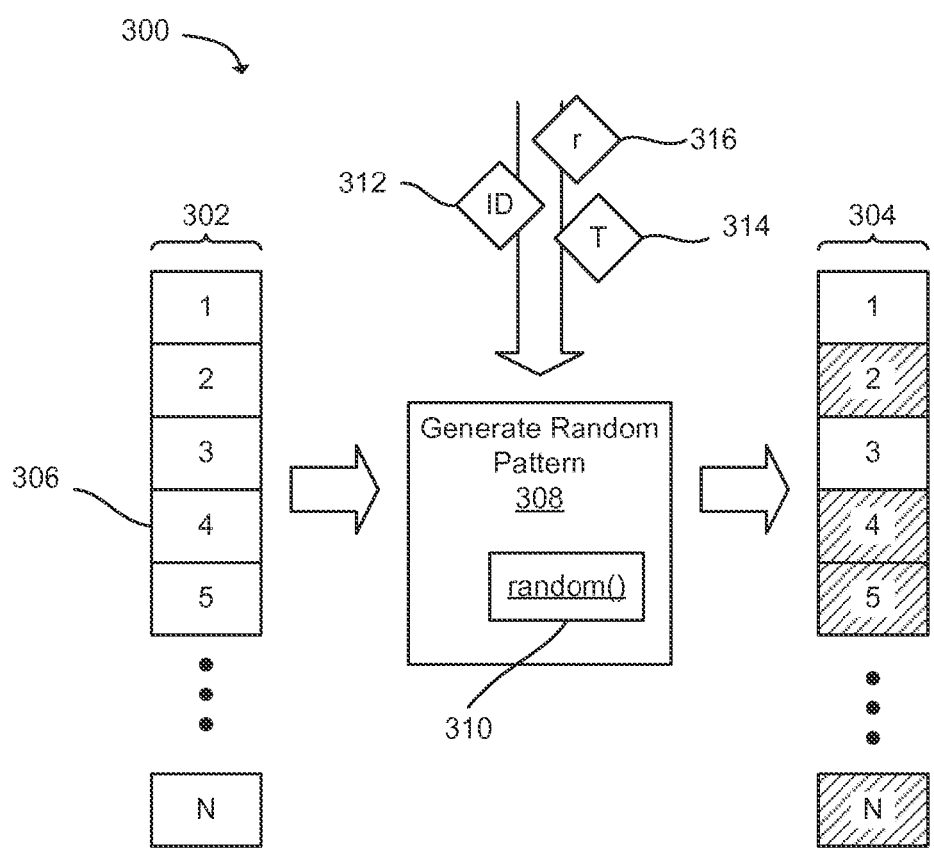
FIG. 3 is a schematic diagram illustrating generation of a resource usage map consistent with embodiments disclosed herein.

In one embodiment, the resource usage component 214 may generate a resource usage map using a random number generator or random pattern generator. For example, the random number generator may generate a number which can be used to determine whether a specific resource element is available to a specific wireless communication device. FIG. 3 is a schematic diagram illustrating one embodiment of generation of a resource usage map 304. FIG. 3 illustrates a resource map 302 having logical divisions including resource units 306 within an available wireless resource. Although the resource map 302 illustrates a linear division of resource units 306, the resource map 302 may also correspond to more complex time and frequency divisions. Based on the resource map 302, the resource usage component 214 generates a random pattern 308 using a random number generator 310 that indicates available and/or unavailable resource units 306.

The resource usage component 214 may use identification information 312, a scheduling period 314, and a resource utility rate 316 as input to generate the resource usage map 304. The identification information 312 may include identifiers or other identification information obtained by the discovery component 208 or reference signal component 212. For example, the identification information 312 may include a MAC address, a D2D UE identifier, or any other identifier that uniquely identifies a wireless communication device with respect to nearby wireless communication devices. By way of example, each of the UEs 102 in FIG. 1 may be able to obtain identification information 312 for each of the nearby UEs 102. The scheduling period 314 may include a scheduling period or interval for which resources are being scheduled. In one embodiment, if scheduling occurs every 20 milliseconds, the scheduling period 314 may allow a resource usage map for the next 20 milliseconds to be generated. Based on the size of resource units 306, the random number generator 310 may determine a random number or random pattern for the number of resource units 306 within the scheduling period 314. For example, in a time division system, N multiplied by the length of a resource unit 306 equals T, the scheduling period 314. In one embodiment, the scheduling period 314 may be a standardized value or may be configured by an eNodeB 104 or other network infrastructures. The resource utility rate 316 indicates a percentage or fraction of the total D2D resource that is allowed for usage by a single D2D pair or group. For example, if a D2D group is using a UL resource for D2D communication, the resource utility rate 316 may indicate how much of the UL resource (e.g., 5%, 10%, 20%) may be used by each resource. The resource utility rate 316 may indicate what percentage of the resource units 306 need to be "unavailable" for a specific wireless communication device.

As an example, if the resource utility rate 316 is 10%, the resource usage component 214 may generate random numbers until only 10% of the resource units 306 are available for a specific wireless communication device. The resource utility rate 316 may be a standardized value or may be modified based on density. For example, in an LTE deployment, an eNodeB 104 may provide the resource utility rate 316 to UEs 102 to increase or decrease based on increased or decreased density, respectively.

The resource usage map 304 results from generating the random pattern 308 by the resource usage component 214. The resource usage map 304 indicates resource units 306 which are available for a specific wireless communication device. For example, the wireless communication device may not be allowed to receive during resource units 306 labeled as "2", "4", "5", and "N", which are illustrated with shading. In one embodiment, the wireless communication device may not be allowed to receive or transmit during unavailable resource units. On the other hand, resource units 306 labeled as "1" and "3" may be available to the corresponding radio for reception and/or transmission. If the resource usage map 304 corresponds to a parent device (e.g., the device that calculated the resource usage map 304), the parent device may prevent transmission and/or reception during unavailable resource units. On the other hand, if the resource usage map 304 corresponds to a target device to which a parent device plans to send a signal, the parent device may send the signal only during an available resource unit.

In one embodiment, the random number generator 310 includes a predefined random number generator that is known to all wireless communication devices operating within the same resource spectrum, within the same geographic location, and/or using the same communication standard. For example, the random number generator 310 may be defined within a communication standard, may be communicated to wireless communication devices by network infrastructure, or may be communicated between peer wireless communication devices. The random number generator 310 is also configured to provide identical output based on identical input. For example, if the same identification information 312, scheduling period 314, and/or resource utility rate 316 are used by the predefined random number generator 310, the same resource usage map 304 is generated. In one embodiment, the random number generator 310 is configured to generate unique numbers or patterns based on different input such that there is a low likelihood that different devices will have a same resource usage map 304.

Because the random number generator 310 is known to other wireless communication devices and because input for generating the resource usage blocks is known to other wireless communication devices, the wireless communication devices are able to determine the same resource usage maps. For example, the random number generator 310 of each wireless communication device may generate the same map for each specific wireless communication device. Thus, each of the wireless communication devices knows the schedule for itself and for other nearby wireless communication devices without explicit communication of the resource usage map 304. This reduces control overhead while allowing for synchronous distributed scheduling.

Figure 4:
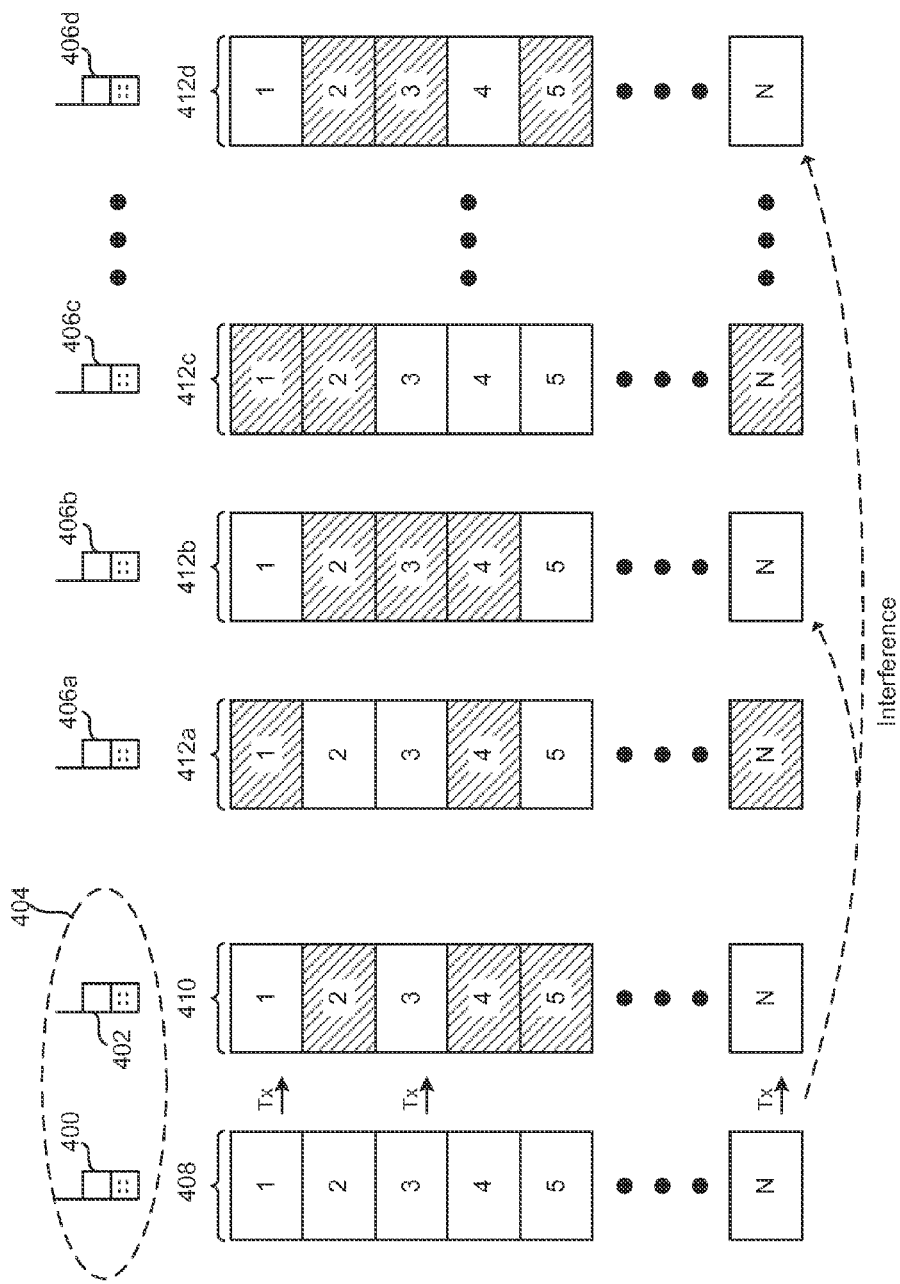
FIG. 4 is a schematic diagram illustrating resource usage maps for a target device and a plurality of interfering devices consistent with embodiments disclosed herein.

FIG. 4 is a schematic diagram illustrating example resource usage maps for a target UE 402 and a plurality of interfering UEs 406a, 406b, 406c, 406d. A source UE 400 has a corresponding resource map 408 which indicates resource units during which the UE 400 is available to send a message. A target UE 402 has a corresponding resource usage map 410 and interfering UEs 406a, 406b, 406c, 406d have corresponding resource usage maps 412a, 412b, 412c, 412d, respectively. Each of the resource usage maps 410, 412a, 412b, 412c, 412d indicate shaded resource units in which a corresponding UE is not available for reception of a wireless signal. Each of the resource usage maps 410, 412a, 412b, 412c, 412d may have previously been generated by a resource usage component 214 of the source UE 400 and/or the target UE 410 as well as interfering UEs 406a, 406b, 406c, 406d. Although the resource map 408 does not indicate any unavailable resource units, the source UE 400 may be restricted from receiving or sending signals based on a corresponding resource usage map.

If the source UE 400 needs to send a message to the target UE 402, the source UE 400 can reference a resource usage map to determine that the target UE 402 is unavailable to receive transmissions during resource units "2", "4", and "5." Thus, the UE 400 will know not to schedule a transmission during resource units "2", "4", and "5." Similarly, because other UEs 402, 406a, 406b, 406c, 406d all know the resource usage maps 410, 412a, 412b, 412c, 412d they will avoid transmissions based on the resource usage maps as well. As illustrated, many of the UEs are "unavailable" during each resource unit. This imposed unavailability alone can significantly reduce interference and the amount of data retransmissions that are needed. Interference can be further reduced by calculating a SIR for resource units and scheduling transmissions during resource usage blocks with the highest available SIR. SIRs and scheduling will be further discussed below.

Returning to FIG. 2, the SIR component 216 calculates a SIR for a specific resource unit. In one embodiment, the SIR component 216 calculates an anticipated SIR for one or more of the parent wireless communication device 200, a target wireless communication device, and/or unpaired nearby wireless communication devices for each resource unit in a resource usage map. In one embodiment, the SIR component 216 calculates a SIR for a target wireless communication device, such as device to which the parent wireless communication device 200 is preparing to send a wireless signal.

In one embodiment, the SIR component 216 calculates an anticipated SIR based on received power levels for other wireless communication devices. In one embodiment, the SIR component 216 sums received power levels for reference signals from the one or more nearby wireless communication devices (non-target or unpaired radios) which are available during the resource unit to generate a summed interference power level. In one embodiment, the SIR component 216 calculates an anticipated SIR for each resource unit by dividing the received power level for the reference signal received from a target wireless communication device by the summed interference power level. Equation 2 below illustrates a calculation for the anticipated SIR based on received power levels.

$$SIR_{RefSig}^{Linear} = \frac{P_{S_0,Rx}^{Linear}}{\sum_{i=1}^{N} P_{S_i,Rx}^{Linear}}$$ Eq. 2

The value $SIR_{RefSig}^{Linear}$ represents the linear anticipated SIR for a reference signal at the parent wireless communication device 200. The value $P_{S_0,Rx}^{Linear}$ the received power level from the target wireless communication device (the device for which the SIR is being calculated) and $P_{S_i,Rx}^{Linear}$ is the received power level from the $i^{th}$ interfering (non-target) wireless communication device.

In another embodiment, the SIR component 216 calculates an anticipated SIR based on channel gains for other wireless communication devices. In one embodiment, the SIR component 216 sums channel gains for the one or more nearby wireless communication devices (non-target or unpaired radios) which are available during the resource unit to generate a summed interference channel gain or a summed unpaired channel gain. In one embodiment, the SIR component 216 calculates an anticipated SIR for each resource unit by dividing the channel gain for a target wireless communication device by the summed interference channel gain. In one embodiment, the SIR may be referred to as an interference level. Other methods of calculating an interference level may also be used. Equation 3 below illustrates a calculation for the anticipated SIR based on channel gains.

$$SIR_{RefSig}^{Linear}(i) = \frac{gd_0}{\sum_{k=1}^{M} RUM_k(i) \times gd_k}$$ Eq. 3

The value $SIR_{RefSig}^{Linear}(i)$ represents the linear anticipated SIR for a reference signal at the parent wireless communication device 200 for the $i^{th}$ resource unit (for example, for a resource unit of the resource usage map 304 of FIG. 3). The value $gd_0$ is the received channel gain for the target wireless communication device (the device for which the SIR is being calculated), and $gd_k$ is the channel gain for the $k^{th}$ interfering (non-target) wireless communication device. $RUM_k(i)$ is a resource usage map function or array that returns a value of the resource usage map for the $i^{th}$ resource unit and the $k^{th}$ interfering wireless communication device. $RUM_k(i)$ has a value of one when the $k^{th}$ interfering wireless communication device is available during the $i^{th}$ resource unit. $RUM_k(i)$ has a value of zero when the $k^{th}$ interfering wireless communication device is unavailable during the $i^{th}$ resource unit. Equation 4 below describes the $RUM_k$ function or array.

$$RUM_k(i) = \begin{cases} 1, & \text{if the resource unit is available in } RUM_k \\ 0, & \text{if the resource unit is not available in } RUM_k \end{cases}$$ Eq. 4

In one embodiment, the SIR component 216 determines the anticipated SIR for the paired radio only during resource units for which the paired radio is available and assigns a zero value during unavailable resource units. In one embodiment, using Equation 3, the SIR component 216 determines the anticipated SIR for all resource units using $RUM_k(i)$ based on the resource usage map.

The SIR component 216 may determine the SIR according to the above described methods, or in other methods, based on specifics of a communication standard or communication environment. For example, Equation 2 may be used when about the same transmission (Tx) power for all reference signals can be assumed. Equation 3 may be used when about the same transmission Tx power for all reference signals cannot be assumed. For example, if the same Tx power is used, the Tx power in the channel gains cancel to provide a Rx power ratio, which corresponds to Equation 2.

Returning to FIG. 4, calculation of SIR will be discussed in relation to resource usage maps 410, 412a, 412b, 412c, 412d. Specifically, the SIR component 216 of the source UE 400 can iterate through the resource units 1-N in order to calculate a SIR when sending a signal to the target UE 402. For resource unit "1", the SIR component 216 sums channel gain for UEs 406b and 406d. Because resource usage maps 412a and 412c are shaded during resource unit "1", UEs 406a and 406c do not contribute to the interference and thus their channel gains are not part of the sum. The SIR component 216 then divides the channel gain for the target UE 402 by the summed channel gains for UEs 406b and 406d. FIG. 4 illustrates transmissions from the source UE 400 being sent during each of resource units "1", "3", and "N". These signals may potentially cause interference for UEs 406b and 406d but not with UEs 406a and 406c, since they are unavailable.

The priority component 218 determines a priority for a resource unit corresponding to a target wireless communication device. For example, the priority component 218 may assign an anticipated SIR value calculated by the SIR component 216 as a priority for a resource unit. In one embodiment, the priority component 218 determines the priority by assigning a priority value corresponding to the anticipated SIR when the target UE is available during a resource unit and assigning a minimum priority value when the target UE is unavailable during the resource unit. In one embodiment, the priority component 218 may assign a value based on the SIR value falling within two or more specified ranges. For example, the priority component 218 may assign a highest priority when the anticipated SIR falls within a highest range, a lowest priority when the anticipated SIR falls within a lowest range, and a middle priority when the anticipated SIR falls within a middle range.

The scheduling component 220 schedules a transmission to a target wireless communication device based on one or more of the resource usage maps generated by the resource usage component 214, the SIRs generated by the SIR component 216, and the priorities generated by the priority component 218. In one embodiment, the scheduling component 220 schedules a transmission to a target wireless communication device when a corresponding resource usage map indicates that the target wireless communication device is available. Similarly, the scheduling component 220 may schedule the transmission only during a resource unit when a resource usage map for the parent wireless communication device 200 indicates that the parent wireless communication device 200 is available.

In one embodiment, the scheduling component 220 may schedule transmissions to a target communication device or radio during a resource unit with a highest available anticipated SIR, as calculated by the SIR component 216. For example, if a signal transmission requires two resource units, the scheduling component 220 may schedule the transmission during the two resource units that have a highest anticipated SIR for the target device. Similarly, the scheduling component 220 may schedule a transmission during resource units with the highest available priorities as assigned by the priority component 218. In one embodiment, the scheduling component 220 may not schedule transmissions when the SIR is below a lower SIR limit. For example, a lower SIR limit for the transceiver component 202 may be determined and stored by the scheduling component 220. In one embodiment, the lower SIR limit may be $1/G_r$ where $G_r$ is a control parameter that reflects signal processing gain for received signals for an antenna of the target device. For example, if the target device has two receive antennas, the $G_r$ value may be calculated to be 2 using the maximal-ratio combining (MRC) algorithm.

The transmission component 206 may transmit the signals as schedule by the scheduling component 220.

The transmission power component 222 may optionally calculate a transmission power for a scheduled resource unit based on a signal-to-interference-plus-noise ratio (SINR) for the target device or radio. Calculating the transmission power may include calculating a resource unit specific SINR target according to Equation 5 below.

$$SINR_{Target}^{Linear} = SIR_{RefSig}^{Linear}(i) - \frac{1}{G_r}$$

Maximum and minimum SINR limitations may be applied to ensure that $SINR_{Target}^{Linear}$ falls within desired boundaries $SNR_{Max}^{dB}$ and $SINR_{Min}^{dB}$ to achieve $SINR_{Min}^{dB} \leq SINR_{Target}^{dB} \leq SINR_{Max}^{dB}$. Example values include $SINR_{Max}^{dB} = 20$ dB and $SINR_{Min}^{dB} = 0$ db. These values may be applied according to Equations 6 and 7 below.

$SINR_{Target}^{dB}(i) = MIN[SINR_{Target}^{dB}(i), SINR_{Max}^{dB}(i)]$     Eq. 6

$SINR_{Target}^{dB}(i) = MAX[SINR_{Target}^{dB}(i), SINR_{Min}^{dB}(i)]$     Eq. 7

Finally, a transmission power level can be controlled using Equation 8 below:

$P_{D,tx}^{dB}(i) = MIN[P_{D2D,CMax,Reminded}^{dB}(i), 10 \log_{10}(B) + NI^{dB} + SINR_{Target}^{dB}(i) + L_0^{dB}]$     Eq. 8

Where, $P_{D2D,CMax,Reminded}^{Linear}(0) = P_{CMAX}^{Linear}$     Eq. 9

$P_{D2D,CMax,Reminded}^{Linear}(i) = P_{D2D,CMax,Reminded}^{Linear}(i-1) - P_{D,Tx}^{Linear}(i-1)$     Eq. 10

$P_{CMAX}^{Linear}$ is the maximum allowed transmission power of the source wireless communication device, such as a D2D UE. $10 \log_{10}(B)$ is the transmission resource unit bandwidth factor and B can be expressed in Hertz (Hz). $NI^{dB}$ is the noise and interference power level on the source wireless communication device in dBm, such as a paired D2D UE. $L_0^{dB}$ is the measured pathloss value among a D2D pair, expressed in dB.

Figure 5:
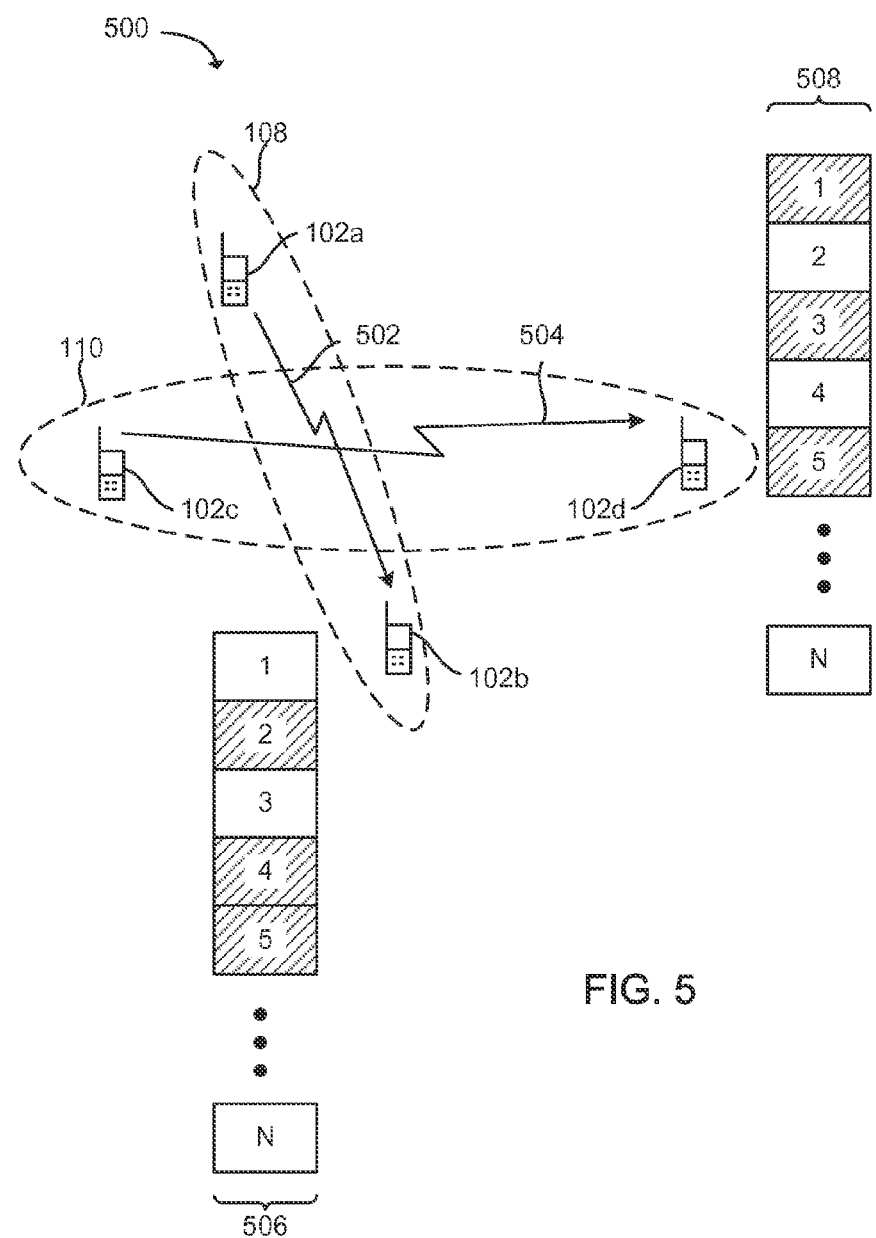
FIG. 5 is a schematic diagram illustrating communications in potentially interfering device-to-device groups consistent with embodiments disclosed herein.

FIG. 5 is a schematic diagram illustrating interfering D2D groups 108, 110 of D2D UEs 102. The D2D group 108 includes a source UE 102a and a target UE 102b, and the D2D group 110 includes a source UE 102c and a target UE 102d. The target UE 102b has a corresponding resource usage map 506, and the target UE 102d has a corresponding resource usage map 508. The resource usage maps 506 and 508 are different which reduces an amount of interference because source UEs 102a and 102c may not be transmitting interfering signals 502 and 504 within the same resource units. However, even if the resource usage maps 506 and 508 do have overlapping resource units, these may have lower priority for transmissions due to anticipated SIR and may be less likely to be scheduled by the scheduling component 220. Furthermore, transmission power control by the transmission power component 222 may reduce the amount of interference received and thereby reduce the likelihood that a retransmission will be needed even when transmissions are sent during the same resource unit.

Figures 6, 7:
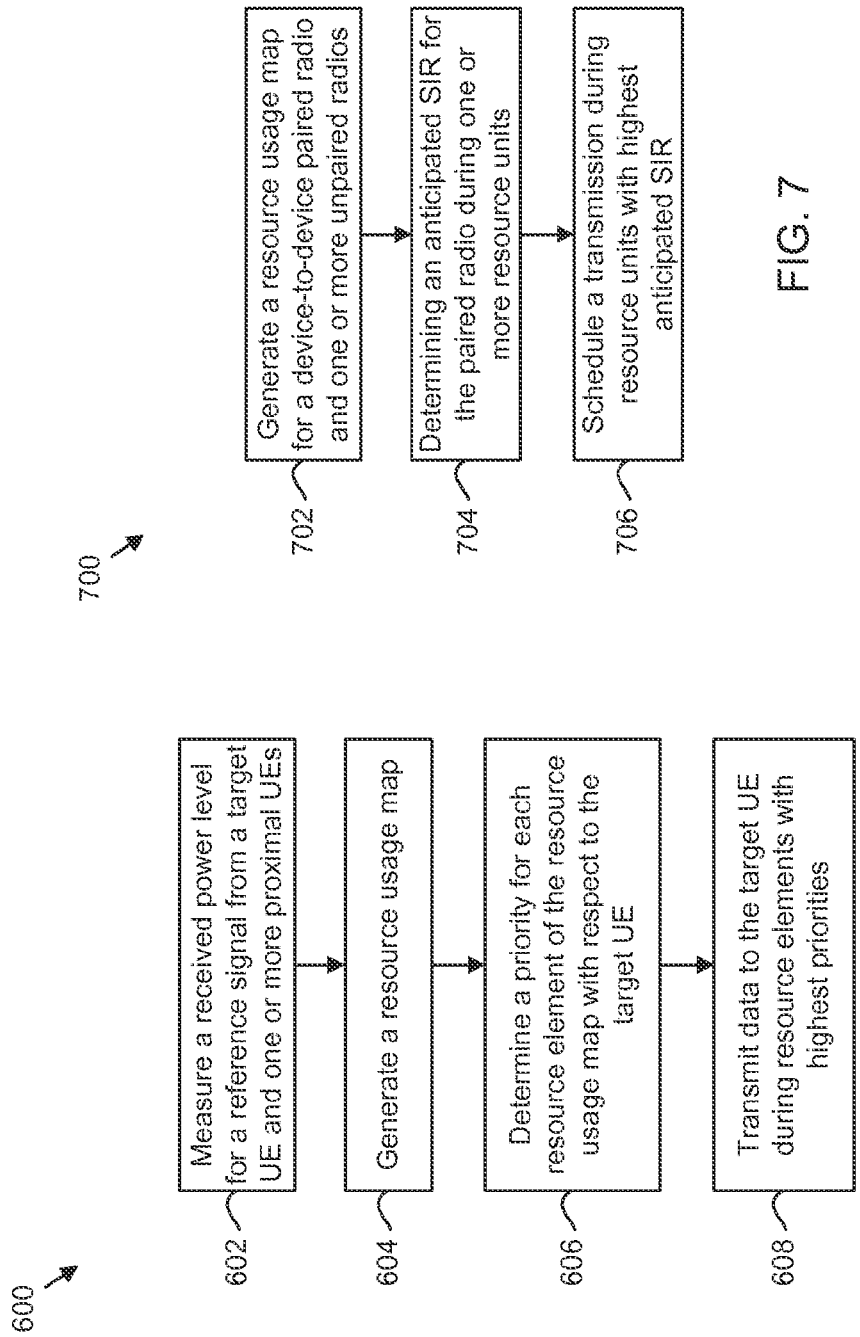
FIG. 6 is a schematic flow chart diagram illustrating a method for transmitting information to a device-to-device paired wireless communication device consistent with embodiments disclosed herein.
FIG. 7 is a schematic flow chart diagram illustrating a method for distributed scheduling consistent with embodiments disclosed herein.

FIG. 6 is a schematic flow chart diagram illustrating a method 600 for transmitting information to a D2D paired UE. Although the method 600 will be discussed in relation to a UE, the method 600 may be performed by any other wireless communication device or radio, in some embodiments. In one embodiment, the method 600 may be performed by the wireless communication device of FIG. 2.

The method 600 begins and a reference signal component 212 measures 602 a received power level for one or more reference signals. The reference signals measured 602 by the reference signal component 212 may include a reference signal from a target UE (a UE to which the parent UE will transmit a signal) and/or one or more non-target or nearby UEs. The non-target UEs may include UEs that may be nearby or at least close enough to cause interference with the parent UE or target UE.

A resource usage component 214 generates 604 a resource usage map. The resource usage map may include one or more of a resource usage map for a parent UE, a target UE, and/or one or more non-target UEs. In one embodiment, the resource usage map indicates resource element groups within an available D2D spectrum for which a corresponding UE is available for reception. In one embodiment, the resource usage component 214 generates 604 the resource usage map using a random number generator.

A priority component 218 determines 606 a priority for each resource element group of the resource usage map with respect to the target UE. In one embodiment, the priority component 218 determines the priority based on the resource usage map and/or a received power level for the target UE and the one or more non-target UEs. In one embodiment, the priority component determines 606 the priority based on a SIR calculated by the SIR component 216.

A transmission component 206 transmits 608 data to the target UE during resource element groups with the highest priorities. For example, the transmission component 206 may transmit 608 during resource element groups scheduled by a scheduling component 220.

FIG. 7 is a schematic flow chart diagram illustrating a method 700 for distributed scheduling for D2D communication. In one embodiment, the method 700 may be performed by any radio device such as a UE or the wireless communication device of FIG. 2.

The method 700 begins and a resource usage component 214 generates 702 a resource usage map for a D2D paired radio and one or more unpaired radios. The D2D paired radio may include a radio that is part of a D2D group with a parent radio. In one embodiment, the resource usage component 214 generates 702 the resource usage map using respective identification information for each radio. In one embodiment, the resource usage component 214 generates 702 the resource usage map using a predefined random number generator.

A SIR component 216 determines 704 an anticipated SIR for the paired radio during one or more resource units. For example, the SIR component 216 may determine 704 the anticipated SIR for each resource unit during which the paired radio is indicated as available in the resource usage map generated 702 by the resource usage component 214. In one embodiment, the SIR component 216 determines 704 the SIR by summing a channel gain for each of the one or more unpaired radios that will be available during a resource unit to generate a summed interference channel gain and by dividing a channel gain for the paired radio by the summed interference channel gain. In one embodiment, the SIR component 216 determines 704 the SIR by summing received power levels for reference signals from the one or more unpaired radios which are available during the resource unit to generate a summed interference power level and dividing the received power level for the reference signal received from the paired radio by the summed interference power level.

A scheduling component 220 schedules 706 a transmission during resource units with the highest anticipated SIR. For example, the scheduling component 220 may schedule resource units with the highest anticipated SIR for a specific target radio. In one embodiment, the scheduling component 220 may only schedule if a resource usage map indicates that the target radio is available and that the anticipated SIR is above a predefined threshold.

Figure 8:
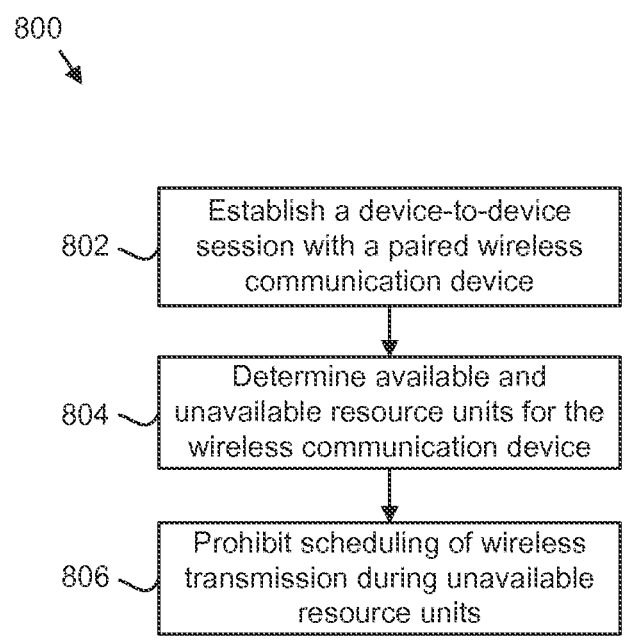
FIG. 8 is a schematic flow chart diagram illustrating another method for distributed scheduling consistent with embodiments disclosed herein.

FIG. 8 is a schematic flow chart diagram illustrating another method 800 for distributed scheduling for D2D communication. In one embodiment, the method 800 may be performed by any radio device such as a UE or the wireless communication device of FIG. 2.

The method 800 begins and a D2D session component 210 establishes 802 a D2D session with a paired wireless communication device. The D2D session component 210 may establish 802 the D2D session in response to a command or request from a network component (such as an eNodeB) or an application running on a parent device. In one embodiment, the D2D session component 210 establishes 802 the D2D session following D2D discovery for nearby wireless communication devices.

A resource usage component 214 determines 804 available and unavailable resource units for the wireless communication device. In one embodiment, the resource usage component 214 also determines 804 available and unavailable resource units for one or more of the paired wireless communication devices and one or more non-target wireless communication devices. The resource usage component 214 determines 804 the available and unavailable resource units using a predefined random number generator and identifiers for respective wireless communication devices. In one embodiment, the random number generator generates identical output based on identical input to allow other UEs to determine the same available and unavailable resource units for each wireless communication device.

A scheduling component 220 prohibits 806 scheduling of wireless transmission to a paired wireless communication device during unavailable resource units. For example, the scheduling component 220 may prohibit 806 scheduling during unavailable resource units for a parent wireless communication device and/or the paired wireless communication device. Prohibition 806 of scheduling during unavailable resource units may allow for decreased interference with other wireless communication devices and improve throughput and communication performance.

Figure 9:
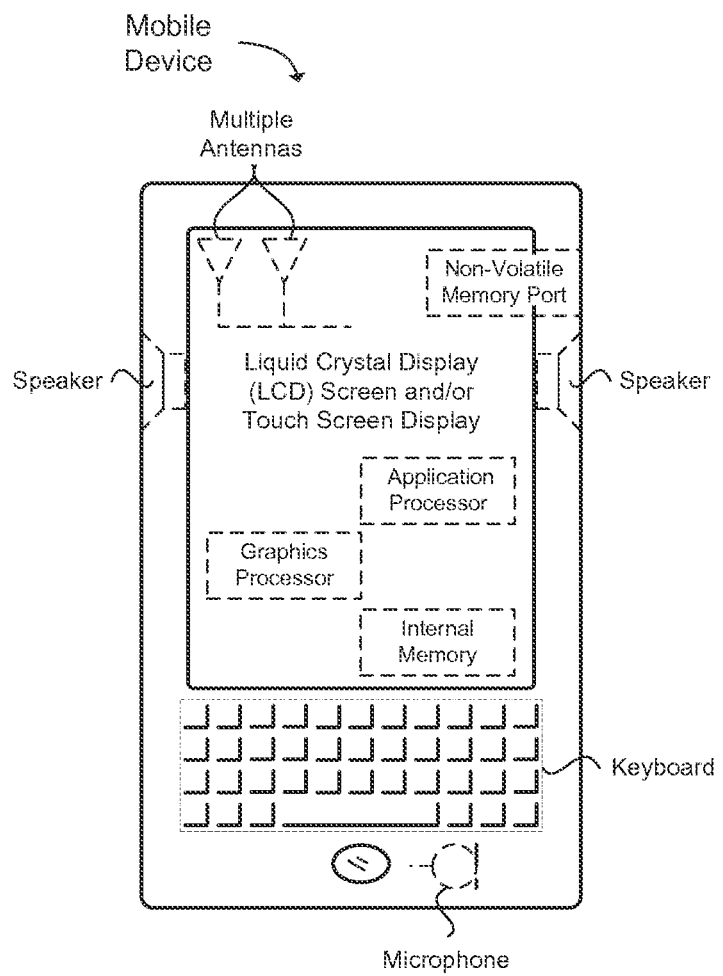
FIG. 9 is a schematic diagram of a mobile device consistent with embodiments disclosed herein.

FIG. 9 is an example illustration of a mobile device, such as a UE, a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard including 3GPP LTE, WiMAX, high speed packet access (HSPA), Bluetooth, and Wi-Fi. The mobile device can communicate using separate antennas for each wireless communication standard or shared antennas for multiple wireless communication standards. The mobile device can communicate in a WLAN, a wireless personal area network (WPAN), and/or a WWAN.

FIG. 9 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments:

Example 1 is a UE that includes a processor and a memory coupled with the processor. The memory stores instructions which cause the UE to measure a received power level of a reference signal received from a target UE and measure received power levels for reference signals received from one or more non-target UEs. The memory also stores instructions which cause the UE to generate resource usage maps for the target UE and the one or more non-target UEs. Each resource usage map indicates resource element groups in an available D2D spectrum for which a corresponding UE is available for reception. The memory further stores instructions which cause the UE to determine a priority, with respect to the target UE, for each resource element group based on the resource usage map and an anticipated SIR. The anticipated SIR is based on the received power level for the reference signal received from the target UE and the reference signals received from one or more non-target UEs. The memory also stores instructions which cause the UE to transmit data to the target UE within one or more resource element groups with highest priorities for the target UE.

In Example 2, the UE of Example 1 optionally determines the priority for a resource element group by calculating the anticipated SIR for the resource element group. The UE calculates the anticipated SIR by summing the received power levels for reference signals from the one or more non-target UEs which are available during the resource element group to generate a summed interference power level and dividing the received power level for the reference signal received from the target UE by the summed interference power level.

In Example 3, the UE of Examples 1-2 can optionally determine the priority by assigning a priority value corresponding to the anticipated SIR when the target UE is available during a resource element group and assigning a minimum priority value when the target UE is unavailable during the resource element group.

In Example 4, the UE of Examples 1-3 can optionally transmit the data to the target UE within resource units during which the anticipated SIRs are at least greater than or equal to a lower SIR limit.

In Example 5, the memory of Examples 1-4 can optionally store instructions which when executed by the processor cause the UE to establish a D2D session with the target UE.

In Example 6, the memory of Examples 1-5 can optionally store instructions which when executed by the processor cause the UE to schedule transmission of the data to the target UE during the one or more resource element groups with the highest SIRs for the target UE.

In Example 7, the UE of Examples 1-6 can optionally generate the resource usage map using a predefined random number generator known to other UEs such that each of the target UE and the one or more non-target UEs are capable of generating the same resource usage map.

In Example 8, the reference signals of Examples 1-7 may optionally include identification information corresponding to the target UE and the one or more non-target UEs. The UE may generate the resource usage map by using the identification information as input for the predefined random number generator.

Example 9 is a method that includes generating a resource usage map for a D2D paired radio and one or more unpaired radios using respective identification information and a predefined random number generator. The resource usage map indicates resource units for which a corresponding radio is available for reception. The method further includes summing a channel gain for each of the one or more unpaired radios that will be available during a resource unit of the resource units to generate a summed unpaired channel gain and dividing a channel gain for the paired radio by the summed unpaired channel gain to generate an interference level. The method further includes scheduling a transmission to the paired radio during one or more resource units comprising interference levels greater than a lower limit.

In Example 10, the method of Example 9 can optionally include determining the channel gain for the paired radio, and determining the channel gain for each of the one or more unpaired radios.

In Example 11, the method of Examples 9-10 can optionally include calculating a transmission power for a scheduled resource unit based on the interference level for the paired radio.

In Example 12, the method of Examples 9-11 can optionally include generating the resource usage map further by using a scheduling period as input to the random number generator and using a resource utility rate. The resource utility rate defines a portion of an available spectrum resource for usage by a D2D pair.

Example 13 is a wireless communication device that includes a D2D session component, a resource usage component, and a scheduling component. The D2D session component is configured to establish a D2D session with a paired wireless communication device. The resource usage component is configured to determine available and unavailable resource units for the wireless communication device, the paired wireless communication device, and one or more unpaired wireless communication devices using a predefined random number generator. The resource usage component determines the available or unavailable resource units using identifiers for respective wireless communication devices as input to the predefined random number generator. The random number generator generates identical output based on identical input. The scheduling component is configured to prohibit scheduling of wireless transmission during unavailable resource units for the wireless communication device and prohibit scheduling wireless transmission to the paired wireless communication device during unavailable resource units for the paired wireless communication device.

In Example 14, the wireless communication device of Example 13 can optionally further include a signal-to-interference component configured to determine an anticipated SIR for a resource unit by summing a channel gain for each of the one or more unpaired wireless communication devices that will be available during the resource unit to generate a summed interference channel gain and dividing a channel gain for the paired wireless communication device by the summed interference channel gain.

In Example 15, the wireless communication device of Examples 13-14 can optionally further include a reference signal component configured to determine the channel gain for each of the one or more unpaired wireless communication devices and the paired wireless communication device.

In Example 16, the wireless communication device of Examples 13-15 can optionally further include a scheduling component that is configured to schedule wireless transmission to the paired wireless communication device during one or more resource units having highest SIRs.

In Example 17, the wireless communication device of Examples 13-16 can optionally further include a signal-to-interference component configured to determine an anticipated SIR for a resource unit by summing received power levels for reference signals from the one or more unpaired wireless communication devices which are available during the resource unit to generate a summed interference power level and dividing a received power level for the reference signal received from the paired wireless communication device by the summed interference power level.

In Example 18, the predefined number generator of Examples 13-17 is optionally defined within the wireless communication device, the paired wireless communication device, and the one or more unpaired wireless communication devices prior to establishing the D2D session.

In Example 19, the wireless communication device of Examples 13-18 can optionally further include a discovery component configured to discover the identifiers of one or more of the paired wireless communication devices and one or more unpaired wireless communication devices.

In Example 20, identifiers of Examples 13-19 can optionally include at least one of a MAC address for a wireless communication device configured to communicate using a Wi-Fi protocol, a D2D identifier for a wireless communication device comprising UE configured to communicate with an E-UTRAN, and an identifier for a wireless communication device configured to communicate in a WBAN.

Example 21 is a method that includes measuring a received power level of a reference signal received from a target UE and measure received power levels for reference signals received from one or more non-target UEs. The method also includes generating resource usage maps for the target UE and the one or more non-target UEs. Each resource usage map indicates resource element groups in an available D2D spectrum for which a corresponding UE is available for reception. The method further includes determining a priority, with respect to the target UE, for each resource element group based on the resource usage map and an anticipated SIR. The anticipated SIR is based on the received power level for the reference signal received from the target UE and the reference signals received from one or more non-target UEs. The method also includes transmitting data to the target UE within one or more resource element groups with highest priorities for the target UE.

In Example 22, the method of Example 21 optionally includes determining the priority for a resource element group by calculating the anticipated SIR for the resource element group. Calculates the anticipated SIR may be performed by summing the received power levels for reference signals from the one or more non-target UEs which are available during the resource element group to generate a summed interference power level and dividing the received power level for the reference signal received from the target UE by the summed interference power level.

In Example 23, the methods of any of Examples 21-22 can optionally determine the priority by assigning a priority value corresponding to the anticipated SIR when the target UE is available during a resource element group and assigning a minimum priority value when the target UE is unavailable during the resource element group.

In Example 24, the method of any of Examples 21-23 can optionally include transmitting the data to the target UE within resource units during which the anticipated SIRs are at least greater than or equal to a lower SIR limit.

In Example 25, the method of any of Examples 21-24 can optionally include establishing a D2D session with the target UE.

In Example 26, the method of any of Examples 21-25 can optionally include scheduling transmission of the data to the target UE during the one or more resource element groups with the highest SIRs for the target UE.

In Example 27, the method of any of Examples 21-26 can optionally include generating the resource usage map using a predefined random number generator known to other UEs such that each of the target UE and the one or more non-target UEs are capable of generating the same resource usage map.

In Example 28, the reference signals of any of Examples 21-27 may optionally include identification information corresponding to the target UE and the one or more non-target UEs. Generating the resource usage map may include using the identification information as input for the predefined random number generator.

Example 29 is a method that includes generating a resource usage map for a D2D paired radio and one or more unpaired radios using respective identification information and a predefined random number generator. The resource usage map indicates resource units for which a corresponding radio is available for reception. The method further includes summing a channel gain for each of the one or more unpaired radios that will be available during a resource unit of the resource units to generate a summed unpaired channel gain and dividing a channel gain for the paired radio by the summed unpaired channel gain to generate an interference level. The method further includes scheduling a transmission to the paired radio during one or more resource units comprising interference levels greater than a lower limit.

In Example 30, the method of Example 29 can optionally include determining the channel gain for the paired radio, and determining the channel gain for each of the one or more unpaired radios.

In Example 31, the method of any of Examples 29-30 can optionally include calculating a transmission power for a scheduled resource unit based on the interference level for the paired radio.

In Example 32, the method of any of Examples 29-31 can optionally include generating the resource usage map further by using a scheduling period as input to the random number generator and using a resource utility rate. The resource utility rate defines a portion of an available spectrum resource for usage by a D2D pair.

Example 33 is a method that includes establishing a D2D session with a paired wireless communication device. The method also includes determining available and unavailable resource units for the wireless communication device, the paired wireless communication device, and one or more unpaired wireless communication devices using a predefined random number generator. The available and unavailable resource units are determined using identifiers for respective wireless communication devices as input to the predefined random number generator. The random number generator generates identical output based on identical input. The method further includes prohibiting scheduling of wireless transmission during unavailable resource units for the wireless communication device and prohibiting scheduling wireless transmission to the paired wireless communication device during unavailable resource units for the paired wireless communication device.

In Example 34, the method of Example 33 can optionally further include determining an anticipated SIR for a resource unit by summing a channel gain for each of the one or more unpaired wireless communication devices that will be available during the resource unit to generate a summed interference channel gain and dividing a channel gain for the paired wireless communication device by the summed interference channel gain.

In Example 35, the method of any of Examples 33-34 can optionally further include determining the channel gain for each of the one or more unpaired wireless communication devices and the paired wireless communication device.

In Example 36, the method of any of Examples 33-35 can optionally further include scheduling wireless transmission to the paired wireless communication device during one or more resource units having highest SIRs.

In Example 37, the method of any of Examples 33-36 can optionally further include determining an anticipated SIR for a resource unit by summing received power levels for reference signals from the one or more unpaired wireless communication devices which are available during the resource unit to generate a summed interference power level and dividing a received power level for the reference signal received from the paired wireless communication device by the summed interference power level.

In Example 38, the method of any of Examples 33-37 wherein the predefined number generator is optionally defined within the wireless communication device, the paired wireless communication device, and the one or more unpaired wireless communication devices prior to establishing the D2D session.

In Example 39, the method of any of Examples 33-38 can optionally further include discovering the identifiers of one or more of the paired wireless communication devices and one or more unpaired wireless communication devices.

In Example 40, identifiers of any of Examples 33-39 can optionally include at least one of a MAC address for a wireless communication device configured to communicate using a Wi-Fi protocol, a D2D identifier for a wireless communication device comprising UE configured to communicate with an E-UTRAN, and an identifier for a wireless communication device configured to communicate in a WBAN.

In Example 41, an apparatus includes means to perform a method as described in any of examples 21-40.

In Example 42, a machine readable storage includes machine-readable instructions, when executed, to implement a method or realize an apparatus as described in of examples 1-41.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium, wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

Those having skill in the art will appreciate that many changes may be made to the details of the above-described embodiments without departing from the underlying principles of the disclosure. The scope of the present application should, therefore, be determined only by the following claims.

The invention claimed is:

1. User equipment (UE) configured to communicate with an evolved universal terrestrial radio access network (eUTRAN), comprising:
   a processor; and
   a memory coupled with the processor, the memory storing instructions which when executed by the processor cause the UE to:
      measure a received power level of a reference signal received from a target UE and measure received power levels for reference signals received from a plurality of non-target UEs;
      generate resource usage maps for the target UE and each of the plurality of non-target UEs, wherein each resource usage map indicates resource element groups in an available device-to-device spectrum for which a corresponding UE is available for reception;
      determine a priority, with respect to the target UE, for each resource element group based on the resource usage map and an anticipated signal-to-interference ratio, wherein the anticipated signal-to-interference ratio for each resource element group is based on the received power level for the reference signal received from the target UE and only those of the reference signals that are received from those of the plurality of non-target UEs that are available during the each resource element group; and
      transmit data to the target UE within one or more resource element groups with highest priorities for the target UE.

2. The UE of claim 1, wherein the UE determines the priority for a resource element group by calculating the anticipated signal-to-interference ratio for the resource element group, wherein calculating the anticipated signal-to-interference ratio comprises:
   summing the received power levels for reference signals from only those of the plurality of non-target UEs that are available during the resource element group to generate a summed interference power level; and
   dividing the received power level for the reference signal received from the target UE by the summed interference power level.

3. The UE of claim 1, wherein determining the priority comprises assigning a priority value corresponding to the anticipated signal-to-interference ratio when the target UE is available during a resource element group and assigning a minimum priority value when the target UE is unavailable during the resource element group.

4. The UE of claim 1, wherein the one or more resource units during which the UE transmits the data to the target UE comprise anticipated signal-to-interference ratios at least greater than or equal to a lower signal-to-interference ratio limit.

5. The UE of claim 1, wherein the memory further stores instructions which when executed by the processor cause the UE to establish a device-to-device session with the target UE.

6. The UE of claim 1, wherein the memory further stores instructions which when executed by the processor cause the UE to schedule transmission of the data to the target UE during the one or more resource element groups with the highest signal-to-interference ratios for the target UE.

7. The UE of claim 1, wherein the UE generates the resource usage map using a predefined random number generator known to other UEs such that each of the target UE and the plurality of non-target UEs are capable of generating the same resource usage map.

8. The UE of claim 7, wherein the reference signals received from the target UE and the one or more non-target UEs comprise identification information corresponding to the target UE and the one or more non-target UEs, and wherein generating the resource usage map comprises using the identification information as input for the predefined random number generator.

9. A method for device-to-device scheduling, the method comprising:
   generating a resource usage map for a device-to-device paired radio and a plurality of unpaired radios using a predefined random number generator and identification information of the paired radio and the plurality of unpaired radios, the resource usage map indicating resource units for which the paired radio and the plurality of unpaired radios are available for reception;
   summing, for each resource unit during which the paired radio is available for reception, channel gains for only those of the plurality of unpaired radios that will also be available during the each resource unit to generate a summed unpaired channel gain for the each resource unit during which the paired radio is available for reception;
   dividing a channel gain for the paired radio by the summed unpaired channel gain to determine an interference level for the each resource unit during which the paired radio is available for reception; and
   scheduling a transmission to the paired radio during only those of the resource units during which the paired radio is available for reception that have determined interference levels greater than a lower limit.

10. The method of claim 9, further comprising:
    determining the channel gain for the paired radio; and
    determining the channel gain for each of the plurality of unpaired radios.

11. The method of claim 9, further comprising calculating a transmission power for a scheduled resource unit based on the interference level for the paired radio.

12. The method of claim 9, wherein generating the resource usage map further comprises using a scheduling period as input to the random number generator and using a resource utility rate, the resource utility rate defining a portion of an available spectrum resource for usage by a device-to-device pair.

13. A wireless communication device, comprising:
a device-to-device session component configured to establish a device-to-device session with a paired wireless communication device;
a resource usage component configured to determine available and unavailable resource units for the wireless communication device, the paired wireless communication device, and a plurality of unpaired wireless communication devices using a predefined random number generator, wherein the resource usage component determines the available or unavailable resource units using identifiers for respective wireless communication devices as input to the predefined random number generator, and wherein the predefined random number generator generates identical output based on identical input;
a scheduling component configured to prohibit scheduling of wireless transmission during unavailable resource units for the wireless communication device and prohibit scheduling wireless transmission to the paired wireless communication device during unavailable resource units for the paired wireless communication device; and
a signal to interference component configured to determine an anticipated signal-to-interference ratio for a resource unit by:
summing received power levels for reference signals from only those of the plurality of unpaired wireless communication devices that will be available during the resource unit to generate a summed interference power level; and
dividing a received power level of a reference signal received from the paired wireless communication device by the summed interference power level;
wherein the scheduling component is further configured to schedule wireless transmission to the paired wireless communication device during one or more resource units having highest signal-to-interference ratios.

14. The wireless communication device of claim 13, wherein the signal-to-interference component is also configured to determine another anticipated signal-to-interference ratio for a resource unit by:
summing a channel gain for only those of the plurality of unpaired wireless communication devices that will be available during the resource unit to generate a summed interference channel gain; and
dividing a channel gain for the paired wireless communication device by the summed interference channel gain.

15. The wireless communication device of claim 14, further comprising a reference signal component configured to determine the channel gain for each of the plurality of unpaired wireless communication devices and the paired wireless communication device.

16. The wireless communication device of claim 13, wherein the predefined number generator is defined within the wireless communication device, the paired wireless communication device, and the plurality of unpaired wireless communication devices prior to establishing the device-to-device session.

17. The wireless communication device of claim 13, further comprising a discovery component configured to discover the identifiers of one or more of the paired wireless communication devices and one or more of the plurality of unpaired wireless communication devices.

18. The wireless communication device of claim 17, wherein the identifiers comprise at least one of:
a media access control (MAC) address for a wireless communication device configured to communicate using a Wi-Fi protocol;
a device-to-device identifier for a wireless communication device comprising user equipment (UE) configured to communicate with an evolved universal terrestrial radio access network (eUTRAN); and
an identifier for a wireless communication device configured to communicate in a wireless body area network (WBAN).

* * * * *